United States Patent [19]

Hamman

[11] Patent Number: 4,776,739
[45] Date of Patent: Oct. 11, 1988

[54] PLASTIC DRIVE FASTENER

[75] Inventor: Denver C. Hamman, Hinsdale, Ill.

[73] Assignee: Illinois Tool Works Inc., Chicago, Ill.

[21] Appl. No.: 851,578

[22] Filed: Apr. 14, 1986

[51] Int. Cl.$^4$ ............................................. F16B 19/00
[52] U.S. Cl. .................................... 411/510; 411/447; 411/907; 411/913; 24/297
[58] Field of Search .................. 411/508–510, 411/907, 908, 71–73, 451–456, 487–492; 24/297, 453, 614, 615

[56] References Cited

U.S. PATENT DOCUMENTS

| 2,110,959 | 3/1938 | Lombard | 411/447 |
| 2,523,239 | 9/1950 | Tinnerman | 411/508 |
| 3,908,235 | 9/1975 | Telliard et al. | 411/913 |
| 4,392,278 | 7/1983 | Mugglestone | 411/510 |
| 4,396,329 | 8/1983 | Wollar | 411/510 |

FOREIGN PATENT DOCUMENTS

| 1342218 | 9/1962 | France | 411/508 |
| 882898 | 11/1961 | United Kingdom | 24/297 |
| 959039 | 5/1964 | United Kingdom | 411/510 |

Primary Examiner—Neill Wilson
Attorney, Agent, or Firm—Donald J. Breh; T. W. Buckman

[57] ABSTRACT

A one-piece plastic reusable push-in fastener for insertion into an aperture in a workpiece comprising a head portion and a shank portion, the shank portion being integrally formed to one side of the head portion with its longitudinal axis extending away from the head portion and having a particular cross section and a transversely extending fin section intermediate the length of the shank on one side thereof whereby the fin section cooperates with the particular shank cross section to inhibit withdrawal of the fastener from a particular workpiece aperture and to centrally locate the longitudinal axis of the shank with the central axis of the aperture by forcing the periphery of the shank cross section against the inner wall of the workpiece aperture.

10 Claims, 2 Drawing Sheets

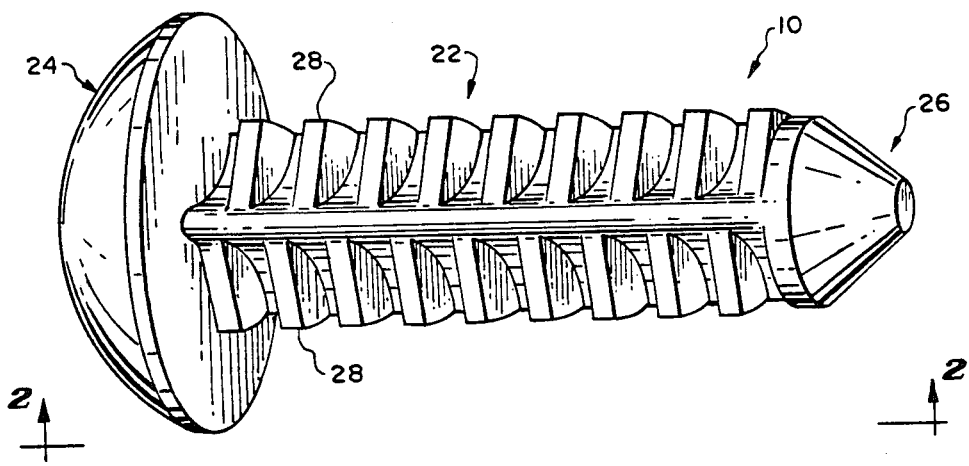
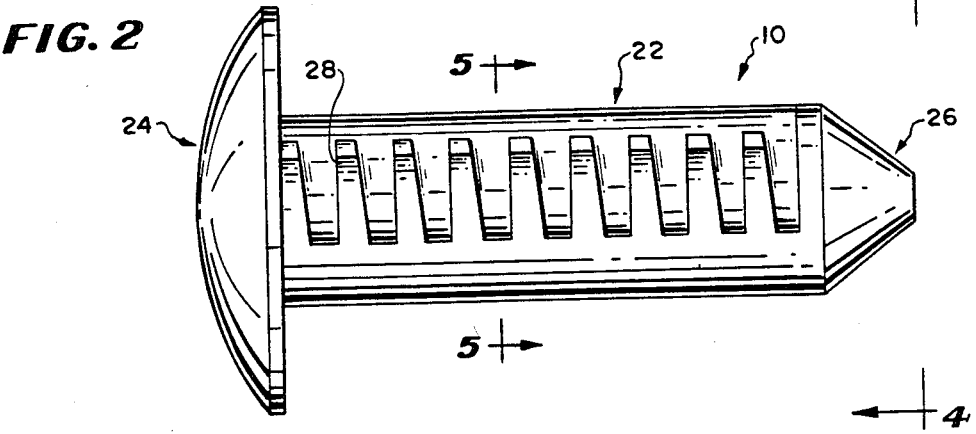
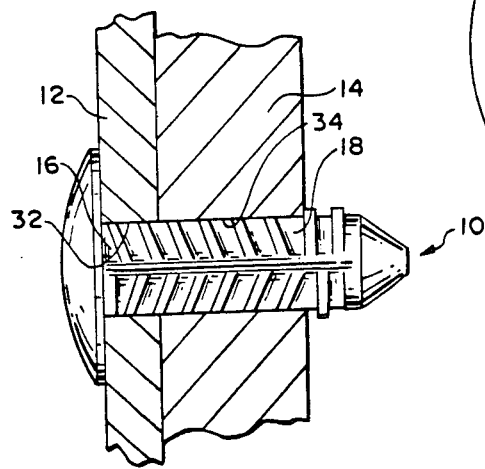
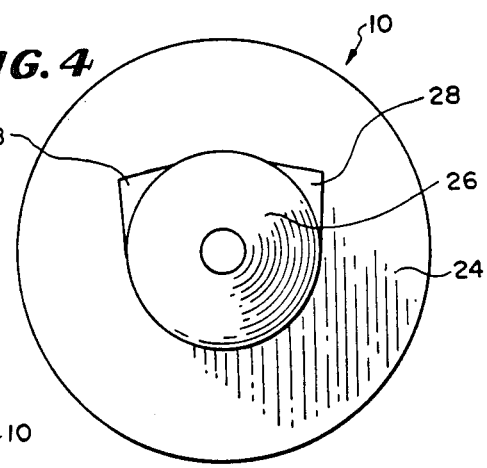
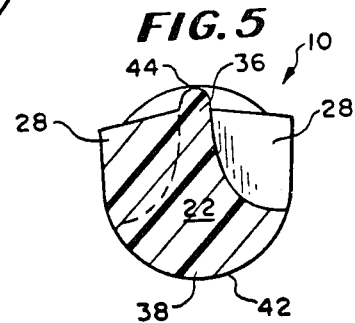

PLASTIC DRIVE FASTENER

BACKGROUND OF THE INVENTION

The present invention relates to fasteners, and more particularly to a push-in fastener for retaining two parts in assembled relationship which does not require a screw thread and which assures that the fastener is centered within the aperture which it is inserted into.

Push-in fasteners are well-known and can be composed of a multiplicity of engaging projections provided around the periphery of a shank and are generally referred to as "Christmas tree fasteners". Fasteners of this type are particularly useful for retaining two panels in assembled relationship, such as a plastic interior trim anel to the body of an automobile. As is well known in the art, fastening is achieved by these "Christman Tree" fasteners since the engaging projections are designed to project radially outward from the shank a distance greater than the apertures in the parts into which they are inserted. Thus, when the shank is inserted into the apertures, the engaging projections bend toward the head of the fastener while positively engaging the inner wall of the apertures and, as each engaging projection clears the back side of the apertures, it will flex back to its original position and engage the back side of the part and prevent withdrawal of the fastener. Self centering of such a fastener is illustrated, for example, in U.S. Pat. No. 4,392,278 which discloses an "H" shaped shank cross section which contacts the inner wall of the aperture at four points. These four points correspond to the end points of each leg of the "H" and center the shank within the aperture. These fasteners however, are normally only effective for insertion into apertures over ⅛ of an inch in diameter. This is due to the fact that when the aperture size is decreased, the leg portion of the shank cross section and the engaging projections must be similarly decreased in size which makes the shank less rigid, thereby losing its centering capability. This decrease in size also affects the holding power of the engaging projections and makes the shank hard to insert since it is susceptible to bending.

The present invention overcomes the problems of previous fasteners by providing a push-in, self-centering fastener for use in any size aperture which maintains a rigid shank to enable insertion and proper holding power even when inserted into a very small aperture.

OBJECTS AND SUMMARY OF THE INVENTION

It is therefore a general object of the present invention to provide a novel and improved push-in fastener.

It is a further object of the present invention to provide such a fastener which can be used with any size aperture, including very small apertures, and can be removed and reinserted over and over again.

A further object of the present invention is to provide such a fastener which is automatically self-centering.

It is still a further object of the present invention to provide such a fastener which is of a plastic one-piece construction and can be affixed without any special tools.

Briefly, and in accordance with the foregoing objects, a fastener according to the invention comprises a head portion and a shank portion which is integrally formed to one side of the head portion.

The shank has a longitudinal axis extending away from the head portion and is designed with a particular cross section.

Extending transversely from the shank portion is at least one resilient fin section which is positioned intermediate the length of the shank for engagement with the inner wall of a workpiece aperture.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements and wherein:

FIG. 1 is a prospective view of a first embodiment of the fastener of the present invention which employs a "T" shaped cross section and two rows of engaging projections.

FIG. 2 is a bottom plan view of the fastener of the present embodiment, taken along line 2—2 of FIG. 1.

FIG. 3 is a detail view in partial section of the fastener in the operative position securing two panels together.

FIG. 4 is a right side plan view of the fastener of the present embodiment, taken along line 4—4 of FIG. 2.

FIG. 5 is a cross-sectional view of the fastener of the present embodiment, taken along line 5—5 of FIG. 2.

DESCRIPTION OF THE PREFERRED EMBODIMENTS

Figure 6:
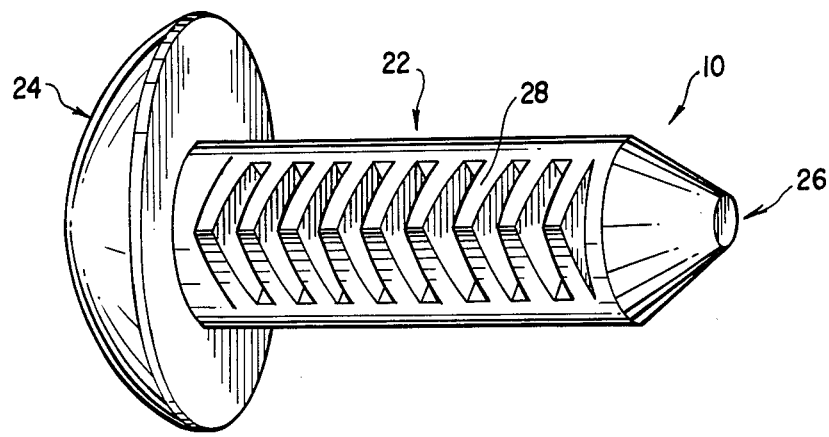
FIG. 6 is a prospective view of a second embodiment of the fastener of the present invention which employs a "crescent" shaped cross section and only one row of engaging projections.
Figure 7:
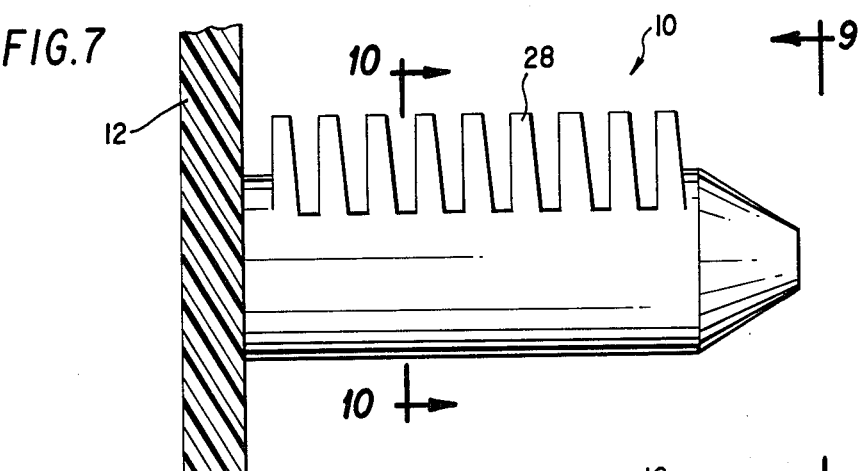
FIG. 7 is a bottom plan view of the fastener of the present embodiment illustrating the head formed with a panel.
Figure 8:
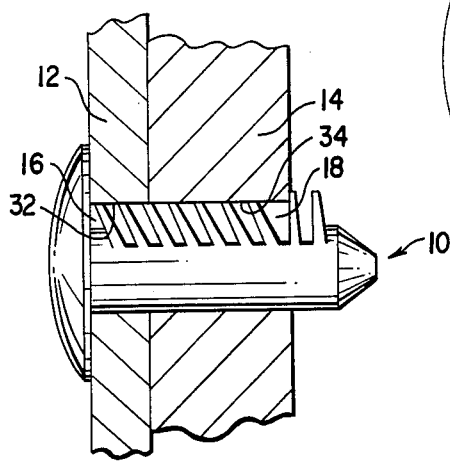
FIG. 8 is a detail view in partial section of the fastener in the operative position securing two panels together.
Figure 9:
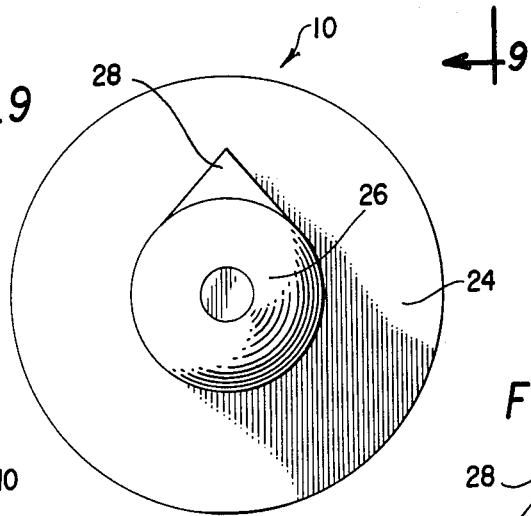
FIG. 9 is a right side plan view of the fastener of the present embodiment taken along line 9—9 of FIG. 7.

Referring now to the drawings in greater detail, there is illustrated in FIGS. 1-5 a fastener 10 constructed according to the teachings of a first embodiment of the present invention.

The fastener 10 is preferably a one-piece molded thermoplastic product which can be fabricated from nylon or other similar materials. Although the fastener 10 can have several different functions it is primarily used to fasten two panels 12 and 14 together through apertures 16 and 18 formed in each panel respectively as illustrated in FIG. 3.

As illustrated in FIG. 1, the fastener 10 is composed of a shank portion 22, a head portion 24 and a nose portion 26. The head 24 in this embodiment is round domed shaped but it is to be understood that any desired head shape can be used. Additionally, the head 24 can be integrally formed with an object, such as panel 12, to be affixed to another object, such as panel 14. The nose 26 is tapered to assist locating the shank 22 centrally in the apertures 16 and 18 formed in the panels 12 and 14 to be fastened.

The embodiment shown in FIGS. 1-5 imploys a shank 22 which contains two rows of outwardly projecting flaps 28. These flaps 28 are spaced around the perimeter of the shank 22 at a position of 140°+/−20° with respect to each other and are used to engage and affix the fastener 10 to the panels 12 and 14 to be fastened. As is well known in the art, fastening is achieved since the flaps 28 are designed to project radially outward from the shank 22 a distance greater than the apertures 16 and 18 into which they are inserted. Thus, when the fastener 10 is inserted into its apertures 16 and 18, the flaps 28 will bend toward the head 24 while positively engaging the inner walls 32 and 34 of the apertures 16 and 18 respectively and, as each flap 28 clears the back side of the panel 14, it will flex back toward the nose 26 and engage the back side of the panel 14 and prevent withdrawal of the fastener as shown in FIG. 3.

In the present invention, the shank 22 in combination with the flaps 28 provides a fastener which can be inserted into apertures smaller than any previously designed fasteners can be inserted and also provides self-centering of the fastener 10 within the apertures.

As FIG. 5 illustrates, the shank 22 aside from the area of the flaps 28 has a cross section which approximates the shape of a "T" or mushroom having a stem portion 36 and a top portion 38. The outside perimeter 42 of the top 38 functions as a heel and is curved to correspond to the curvature of apertures 16 and 18 into which it is to be inserted. It is to be noted that self-centering is achieved since the length of the stem 36 and top 38 corresponds to the diameter of the apertures 16 and 18. This provides contact between the inner walls 32 and 34 of the apertures 16 and 18 and the end 44 of the stem portion 36 and the outside perimeter 42 of the top portion 38, thereby automatically centering the fastener 10 within the apertures 16 and 18. Additionally, since the design of the shank 22 has a greater cross sectional area to start with than the other prior art fasteners, it can be substantially decreased in size for insertion into smaller apertures without lessening its rigidity.

Another embodiment of the present invention is illustrated in FIGS. 6-10. This embodiment is similar to the first embodiment by employing a head 24, shank 22 and nose 26 but has only one row of flaps 28.

Figure 10:
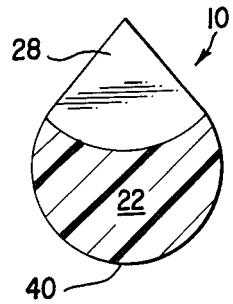
FIG. 10 is a cross-sectional view of the fastener of the present embodiment taken along line 10—10 of FIG. 7.

Additionally, the cross section of the shank 22 outside the flap 28 in this embodiment is crescent shaped as shown in FIG. 10. This design not only provides greater shank cross sectional area and is therefore capable of being inserted into smaller apertures, but it still remains its self centering capability. As can be discerned by examining FIG. 10, since the shank 22 contacts a substantial amount of the inside of the aperture thereby establishing line contact between the outside perimeter 46 and the inner walls 32 and 34 of the apertures 16 and 18, around a distance between 180° and 270°, it automatically maintains the center of the shank 22 with the center of the apertures.

From the foregoing description it will be appreciated that the present invention provides a new and improved fastener for capturing and fixing two panels. More specifically, the present invention provides a new and improved fastener which can be used for any aperture size, including very small apertures, and is automatically self-centering without losing any rigidity which is needed for insertion.

While two particular embodiments of the present invention have been shown and described, it is to be understood that modifications may be made to the fastener without departing from the teaching of the present invention. For example, the cross sectional area of the shank may be of another shape while still providing the function of rigidity and self centering in small apertures. Accordingly, the scope of the invention is only to be limited as necessitated by the accompanying claims.

I claim:

1. A one-piece plastic reusable push-in fastener for insertion into an aperture in a workpiece comprising:
   a head portion and a shank portion, said shank portion being integrally formed to one side of said head portion with its longitudinal axis extending away from said head portion and having a substantially rigid generally T-shaped cross section, said shank also having two longitudinally extending resilient fin sections on adjacent portions of the periphery of the shank each of said sections having a plurality of spaced apart parallel transverse flaps positioned along the length of said shank for engagement with an inner wall of the aperture of the workpiece, whereby said fin sections cooperate with said shank cross section to inhibit withdrawal of said fastener from the workpiece aperture and to centrally locate the longitudinal axis of said shank with the central axis of said aperture by forcing the periphery of said shank cross section against the inner wall of the aperture workpiece.

2. A fastener, as defined in claim 1, wherein said head is domed shaped and has a lateral extent greater than the lateral extent of said fin section.

3. A fastener, as defined in claim 1, wherein said head is integrally formed with an object to be secured to said workpiece.

4. A fastener, as defined in claim 1, wherein said adjacent portions of said shank having the fin sections thereon each have a greater lateral extent than the aperture.

5. A fastener, as defined in claim 1, having a tapered nose at a free end of the shank opposite said head.

6. A one-piece plastic reusable push-in fastener for insertion into an aperture in a workpiece comprising:
   a head portion and a shank portion, said shank portion being integrally formed to one side of said head portion with its longitudinal axis extending away from said head portion and having a substantially rigid generally crescent shaped cross section, said shank also having a resilient fin section extending along the length of said shank and disposed around a portion of the periphery of said shank said fin section having a plurality of spaced apart transversely extending flaps for engagement with an inner wall of the aperture of the workpiece, whereby said fin section cooperates with said shank cross section to inhibit withdrawal of said fastener from said workpiece aperture and to centrally locate the longitudinal axis of said shank with the central axis of said aperture by forcing the periphery of said shank cross section against the inner wall of the workpiece aperture.

7. A fastener, as defined in claim 6, wherein said head is domed shaped and has a lateral extent greater than the lateral extent of said fin section.

8. A fastener, as defined in claim 6, wherein said head is integrally formed with an object to be secured to said workpiece.

9. A fastener, as defined in claim 6, wherein said fin section has a greater lateral extent than the aperture.

10. A fastener, as defined in claim 6, having a tapered nose at a free end of the shank opposite said head.

* * * * *